Oct. 16, 1962     G. L. HETRICK     3,059,203
COLLECTOR RING STRUCTURE
Filed Feb. 20, 1961
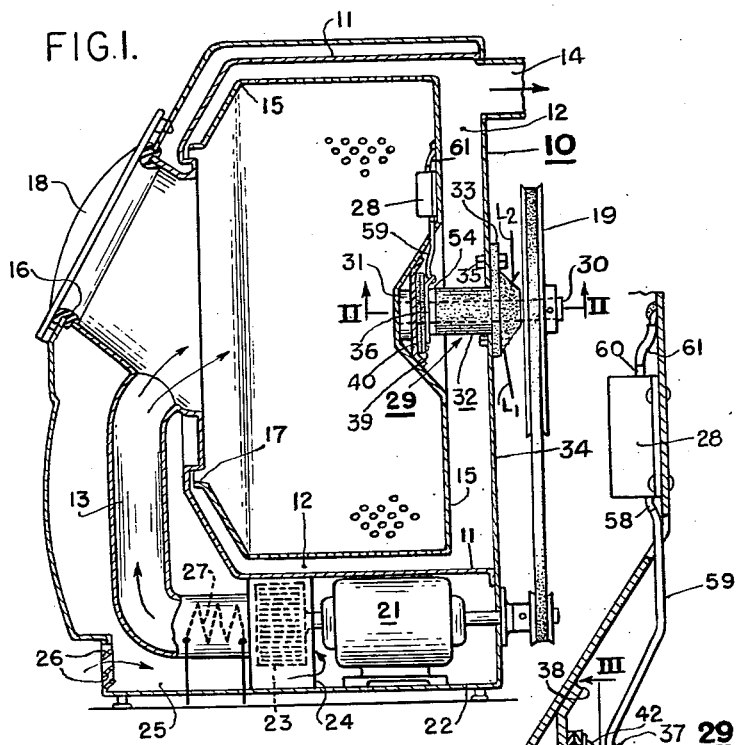
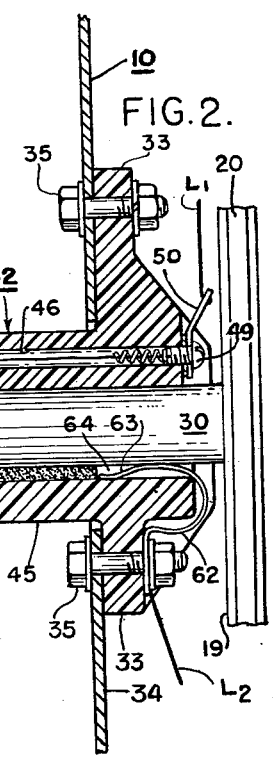
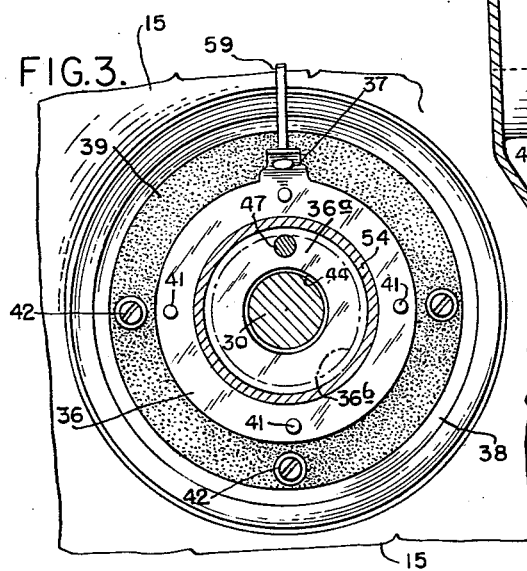
INVENTOR
GEORGE L. HETRICK

United States Patent Office 3,059,203
Patented Oct. 16, 1962

3,059,203
COLLECTOR RING STRUCTURE
George L. Hetrick, Mansfield, Ohio, assignor to Westinghouse Electric Corporation, East Pittsburgh, Pa., a corporation of Pennsylvania
Filed Feb. 20, 1961, Ser. No. 90,407
6 Claims. (Cl. 339—5)

This invention relates to collector ring structure for supplying electrical energy to rotatable structure, more particularly to a collector ring structure suitable for use in an atmosphere having lint or other fine particles of solid matter suspended therein.

In many types of rotating apparatus employing electrical devices mounted on the rotating structure of the apparatus, it is essential to provide collector ring structure for supplying electrical energy to the rotatable electric device. For example, in many instances, domestic clothes dryers are now provided with an electrical device mounted for rotation with the rotatable drum or basket for sensing the condition of dryness in the clothes during the drying cycle. Such devices are well known in the art and are employed to control and/or terminate the drying cycle when the clothes attain a predetermined dry condition. Such an electrical device is disclosed and claimed in H. T. Thunander patent application Serial No. 846,098, filed October 13, 1959, and assigned to the assignee of the present invention.

In view of the above, one of the main objects of the invention is to provide a collector ring structure of the above type, in which the active or contact surface portion of the slip ring or collector ring and the brush means cooperatively associated therewith are enclosed in a chamber, so that they are effectively protected against malfunction occasioned by entry of foreign matter.

A further object of the invention is to provide a collector ring structure of the above type in which the axial thrust forces of the rotating apparatus are absorbed in a simple, yet effective, manner.

A more specific object of the invention is to provide a collector ring structure having a member which is effective to substantially eliminate entry of foreign matter to the active portions of the slip ring member and the brush means, as well as to act as a thrust bearing for absorbing the axial thrust of the rotating apparatus.

A still further object is to provide a collector ring structure of highly improved form, yet inexpensive to manufacture, which may be incorporated in the support structure for the rotatable drum of a domestic clothes dryer.

In accordance with the invention, there is provided an electric collector ring structure comprising cooperating shaft and hub members for rotatably supporting a rotatable structure, such as the drum or basket for tumbling the clothes in a clothes dryer, which rotatable structure has mounted thereon and jointly rotatable therewith an electrical device of any desired type, such as the dampness measuring device disclosed in the above Thunander application. A collector ring member is mounted in encompassing relation with the shaft member and is disposed in juxtaposed relation with one end of the hub member, which hub member carries a brush means disposed in biased abutment with the active face of the collector ring. The brush means and the collector ring complete a rotatable electric circuit from a suitable power source to the electrical device carried by the basket by means of suitable conductors leading from the power source to the collector ring structure, to the electrical device, and thence back to the power source.

The shaft member is received in the hub member and one of the hub and shaft members is connected to the drum to thereby rotatably support the drum, the other of the members being attached to a suitable stationary base portion. The thus generally described collector ring structure is disposed in an atmosphere, usually laden with lint or other foreign matter, which may conceivably deleteriously affect the electrically conducting characteristics of the collector ring structure.

An annular lint shield is disposed in encompassing relation with the brush means and the active or brush contacting portion of the collector ring, thereby to form a chamber which is substantially closed against entrance of such foreign matter from the surrounding atmosphere.

A further feature of the invention resides in so forming and arranging the annular lint shield that, in operation, it is effective to resist the axial thrust imposed by the basket as it rotates. In the embodiment disclosed, the lint shield is mounted on the hub member and slidably bears on the face of the collector ring, thereby acting as a highly efficient thrust bearing, and further being effective to maintain the slip ring in a predetermined plane of rotation.

The foregoing and other objects are effected by the invention as will be apparent from the following description and claims taken in connection with the accompanying drawing, forming a part of this application, in which:

FIG. 1 is a vertical sectional view of a domestic clothes dryer having the collector ring structure incorporated therein;

FIG. 2 is a greatly enlarged axial sectional view taken on line II—II of FIG. 1 and illustrating the detailed arrangement of the collector ring structure; and FIG. 3 is a transverse sectional view taken on line III—III of FIG. 2.

Referring to the drawing in detail, especially FIG. 1, the invention is incorporated in a clothes dryer of the domestic type. This type of dryer usually includes a casing structure 10 having a generally cylindrical baffle 11 arranged therein and enclosing a plenum chamber 12. The plenum chamber is provided with an air inlet duct 13 for conveying heated air to the chamber 12 and an air discharge duct 14 for conveying vitiated moist air therefrom. A generally cylindrical drum or basket 15 is arranged within the drying chamber 12 and is mounted for rotation about a horizontal axis. The cylindrical side wall of the basket is perforate substantially throughout its circumferential extent for the passage of air translated from the air inlet duct 13 throughout the basket 15 to the discharge duct 14. The casing 10 has an opening 16 registering with an opening 17 in the basket 15 for providing access to the interior of the basket for insertion and removal of clothes, and the opening 16 may be closed by a conventional hinged door 18.

The basket is journaled in the casing 10 for rotation about a horizontal axis, in a manner subsequently to be described in detail, and is driven by a sheave 19 belted, as shown at 20, to an electric motor 21 supported by the base portion 22 of the casing 10. The motor 21 also functions to drive a blower rotor 23 arranged within a blower housing 24. The latter is provided with a suitable air inlet opening (not shown) communicating with the space 25 within the casing 10, which space receives air from the surrounding atmosphere through louvered openings 26 formed in the casing front wall. The blower housing 24 discharges into the air inlet duct 13, within which an electric heater 27 of suitable construction is disposed for heating the air discharged by the blower rotor 23. The heated air passes through the duct 13 to the interior of the basket 15 for contacting the tumbling clothes and for the vaporization of water therein and thence to the plenum chamber 12. The vitiated air and the water vapor absorbed thereby pass to the discharge duct 14.

The basket 15 has an electrical device 28 mounted therein and rotatable therewith. This device may be of any type and for any purpose desired. For example, it may be a moisture sensing mechanism of the type disclosed in the above-mentioned Thunander application, and electrically connected to a suitable supply of electrical power, indicated by conductors $L_1$, $L_2$, by a collector ring structure generally designated 29, in accordance with this invention.

Referring to FIGS. 2 and 3, the collector ring structure 29 includes a shaft member 30 connected at one end (the left end as viewed in FIG. 2) to the central rear portion of the basket 15 by a collar 31. The shaft 30 is rotatably received in a stationary tubular hub member 32 which has an enlarged mounting flange portion 33 connected to the rear panel 34 of the casing 10 by a plurality of fastening members, such as bolts and nuts 35. The panel 34 is connected to the base portion 22 and supported thereby. In the embodiment shown, since the shaft member 30 is disposed for rotation about the horizontal axis, the hub member 32 and the shaft member 30 must be sufficiently rigid in construction to support the load imposed thereon by the basket 15.

The collector ring structure further includes a flat disc-like collector or slip ring 36 formed of good electrical conducting material such as brass, copper or the like, and is provided with an electrical connector tang 37. The collector ring 36 is mounted upon a circular plate 38 which is connected at its periphery to the basket 15 and at its central portion to the collar 31 in a rigid manner. Interposed between the collector ring 36 and the plate 38 are a plurality of disc-shaped insulating spacers 39 and 40. The collector ring 36 is primarily attached to the insulator 39 by a plurality of rivets 41, and the insulators 39 and 40 are attached to the plate 38 by a plurality of screws 42. With this arrangement, the rivets 41 are in metal-to-metal contact with the collector ring 36, but are insulated from the plate 38 by the insulator 40. In addition to the above, the collector ring 36 is provided with a central opening 44 of slightly larger diameter than the shaft 30 and disposed in slightly radially spaced relation therewith to prevent the possibility of electrical short-circuiting contact with the shaft 30.

The hub member 32 is further provided with an axially elongated cylindrical portion 45 having a bore 46 extending therethrough in a direction parallel to the axis of the cylindrical portion 45. The bore 46 is open-ended at both ends and has received therein an electrical brush structure including a brush member 47, formed of good electrically conducting material such as carbon, disposed in biased slidable engagement with the active or contacting face portion 36a of the collector ring 36 by a helical spring 48 retained in compression by a screw 49 threadedly received at the right end of the bore 46. By referring to FIG. 3, it will be seen that the active face 36a is of annular shape and its outer periphery is defined by the circular path of the brush 47 thereon, indicated by the dot-dash circle 36b. The screw 49 is further employed to clamp an electrical tang 50 to the mounting flange portion 33. An electrical circuit between the tang 50 and the brush 47 is completed by a stranded or otherwise flexible conductor 51 connected at its ends to the brush 47 and the screw 49.

It will be noted that the collector ring 36 and its associated components are disposed in the plenum chamber 12 so that, during operation of the dryer, the atmosphere surrounding the collector ring structure may be heavily loaded with suspended lint and other particles liberated by the clothes during drying. However, the collector ring 36 and brush 47 are enclosed in an annular chamber 53, the outer periphery of which is defined by a cylindrical member 54, hereafter termed a lint shield. The lint shield 54 is preferably carried by the cylindrical portion 45 of the hub member 32 and is received in fixed encompassing relation with a shoulder portion 55 formed in the left end of the hub member 32. The lint shield 54 extends beyond the end face of the cylindrical portion 45 and is of sufficient radial width to encompass the active face 36a of the collector ring 36. The lint shield further has an annular end face 56 disposed in sliding abutment with the face of the collector ring 36. Although the lint shield may be formed of any suitable material, it is desirable to form it of material having low sliding frictional characteristics as well as sufficient strength to prevent distortion or damage during operation.

In the embodiment shown, the electrical device 28 has one terminal 58 connected to the collector ring tang 37 by a suitable conductor 59, and its other terminal 60 connected to the metal basket 15 by a suitable conductor 61, so that a circut is established from conductor $L_1$ of the power supply, through the tang 50, the screw 49, the stranded electrical conductor 51, the brush 47, the collector ring 36, the tang 37 and the conductor 59, to the electrical device 28, and from the electrical device 28 through the conductor 61 and the basket 15 to the shaft 30.

To complete the circuit, a leaf spring member 62, formed of good electrically conducting material, is anchored at one end by one of the mounting bolts 35, which in turn is connected to conductor $L_2$ of the power supply. The spring member is provided with a flexible finger portion 63 received in an axially extended slot 64 formed in the hub member 32. The finger 63 is disposed in biased abutment with the shaft member 30, thereby completing the circuit to conductor $L_2$ of the power supply. If desired, the slot 64 may be extended axially for the full length of the hub member 32 to receive a suitable lubricating wick 65.

During operation, as the basket 15 is rotated by the motor 21 through the sheave 19, the above electrical circuit is maintained from conductors $L_1$, $L_2$ of the power supply to the electrical device 28, and the good electrical contact characteristics of the collector ring 36 and the cooperating brush 47 are maintained, since the lint shield 54 substantially eliminates the entrance of foreign particles into the chamber 53. Also, the axial thrust forces imposed by the rotating basket 15 are transmitted through the collar 31, the plate 38, the insulators 40 and 39, to the collector ring 36, and thence to the lint shield 54 to maintain a good sliding seal between the end face 56 of the line shield 54 and the collector ring 36. Since the lint shield 54 is carried by the hub member 32, the thrust forces of the basket are transmitted through the lint shield 54 and the cylindrical portion 45 of the hub member to the rear panel 34 by way of the mounting flange 33 and the bolts 35, and thence to the base 22.

Although the brush 47 may be insulated from the hub member 32 in any suitable manner, in the arrangement shown, the hub member 32 is formed of a suitable insulating material for simplicity in manufacture and assembly.

It will now be seen that the invention provides a highly improved yet simplified electrical collector arrangement for rotating apparatus, wherein the collector ring is protected against malfunction by contamination from foreign particles suspended in the surrounding atmosphere.

In addition, the lint shield further serves as an axial thrust bearing for absorbing the thrust forces of the rotating apparatus, during operation, thereby eliminating the imposition of even a portion of the thrust forces on the active portion of the collector ring 36 and the brush 47. The shield 54 is also effective to axially position the collector ring 36 in its plane of rotation, during operation. The brush 47 and the active portion 36a of the collector ring may therefore be maintained in predetermined biased relation with each other for optimum performance.

While the invention has been shown in but one form, it will be obvious to those skilled in the art that it is not so limited, but is susceptible of various changes and modifications without departing from the spirit thereof.

What is claimed is:

1. In combination, a tubular hub member, a shaft member received in said hub member, a base, one said member being attached to said base, means for rotating the other said member, a collector ring disposed in encompassing fixed relation with said shaft member and having an active annular face portion, a brush member carried by said hub member and disposed in slidable biased abutment with the face portion of said collector ring, said brush member defining a circular path on said collector ring during operation, and an annular lint shield interposed between said collector ring and said hub member, said shield encompassing said circular path and defining the outer periphery of a chamber within which said brush is disposed, and said shield having an annular end face disposed in slidable abutment with said face portion.

2. In combination, a rotatable structure, a tubular structure, a tubular hub member, a shaft member received in said hub member, a base, one said member being attached to said base and the other said member being attached to said rotatable structure, means for rotating the other said member, a collector ring disposed in encompassing fixed relation with said shaft member and having an active annular face portion, a brush member carried by said hub member and disposed in slidable biased abutment with the face portion of said collector ring, said brush member defining a circular path on said face portion during operation, and an annular lint shield carried by said hub member and interposed between said collector ring and said hub, said shield encompassing said circular path and defining the outer periphery of a chamber within which said brush is disposed, and said shield having an annular end face disposed in slidable abutment with said face portion and acting as a bearing for transmitting the axial thrust forces imposed by said rotatable structure.

3. In combination, a rotatable structure, an electrical device carried thereby, a tubular hub member, a shaft member received in said hub member, a base, one said member being attached to said base and the other said member being attached to said rotatable structure, means for rotating the other said member, and a collector ring structure for completing an electrical circuit to said electrical device, comprising a slip ring disposed in encompassing fixed relation with said shaft member and having an active face portion disposed transversely to the central axis of said shaft member, a brush member carried by said hub member and disposed in slidable biased abutment with the face portion of said slip ring, said hub member being formed of insulating material and preventing short-circuiting current flow from said brush to said base, said brush member defining a circular path on said face portion during operation, and an annular lint shield interposed between said slip ring and said hub, said shield encompassing said circular path and defining the outer periphery of a chamber within which said brush is disposed, and said shield having an annular end face disposed in slidable abutment with said face portion.

4. In a clothes dryer, the combination of a base, a drum, means for rotatably supporting said drum on said base comprising a hub member and a shaft member received in said hub member, one said member being attached to said drum and the other said member being attached to said base, means for rotating said one member, an electrical device carried by said drum, collector means for conveying electrical current to said electrical device comprising a slip ring disposed in encompassing and fixed relation with said shaft member, a brush carried by said hub member and disposed in biased slidable abutment with said slip ring, and an annular lint shield interposed between said slip ring and said hub member, said lint shield being concentric with the central axis of said hub member and jointly with said shaft member, said hub member and said slip ring defining an annular closed chamber, said lint shield being effective to transmit to said base axial thrust forces of said drum during rotation.

5. In a clothes dryer, the combination of a base, a drum, means for rotatably supporting said drum on said base comprising a hub member and a shaft member received in said hub member, one said member being attached to said drum and the other said member being attached to said base, means for rotating said one member, an electrical device carried by said drum, and a collector structure for conveying electrical current to said electrical device comprising a disc-shaped slip ring disposed in encompassing and fixed relation with said shaft member and having an active face portion disposed transversely to the longitudinal axis of said shaft member, a brush carried by said hub member and disposed in biased slidable abutment with the active face portion of said slip ring, said brush defining a circular path on said face portion during operation, and an annular lint shield encompassing said circular path and interposed between said slip ring and said hub member, said lint shield being carried by said hub member and having an annular end face bearing on the face portion of said slip ring, said lint shield being effective to transmit to said base the axial thrust forces of said drum during rotation, and said shield jointly with said shaft member, said hub member, and said slip ring defining an annular chamber enclosing said brush.

6. In a clothes dryer, the combination of a base, a metallic drum, means for rotatably supporting said drum on said base comprising a hub member and a metallic shaft member received in said hub member, said shaft member being attached to said drum and said hub member being attached to said base, means for rotating said shaft member, an electrical device carried by said drum and having one terminal connected thereto, collector means for conveying electrical current to said electrical device comprising a slip ring connected to another terminal of said device, said slip ring being disposed in encompassing and fixed relation with said shaft member, means for insulating said slip ring from said shaft and said drum, an electrical power supply, a brush member connected to one side of said supply, said brush being carried by said hub member and disposed in biased slidable abutment with said slip ring, means for insulating said brush from said hub member, an annular lint shield interposed between said slip ring and said hub member, said lint shield being carried by said hub member and having an annular end face bearing on said slip ring, said lint shield being effective to absorb axial thrust forces of said drum during rotation, said lint shield jointly with said shaft member, said hub member and said slip ring defining an annular closed chamber enclosing said brush, a resilient conductor electrically connected to said base and biased against said shaft, and means connecting said base to the other side of said power supply.

References Cited in the file of this patent

UNITED STATES PATENTS

| | | |
|---|---|---|
| 2,279,140 | Kellen | Apr. 7, 1942 |
| 2,623,245 | Pierce et al. | Dec. 30, 1952 |
| 2,724,623 | Robinson et al. | Nov. 22, 1955 |
| 2,966,650 | Earnest | Dec. 27, 1960 |

FOREIGN PATENTS

| | | |
|---|---|---|
| 808,804 | Germany | July 19, 1951 |
| 1,075,026 | Germany | Feb. 4, 1960 |